Sept. 2, 1969   D. W. LONGSHORE   3,464,277
TWO SPEED POWER TAKE-OFF
Filed March 28, 1968   2 Sheets-Sheet 1
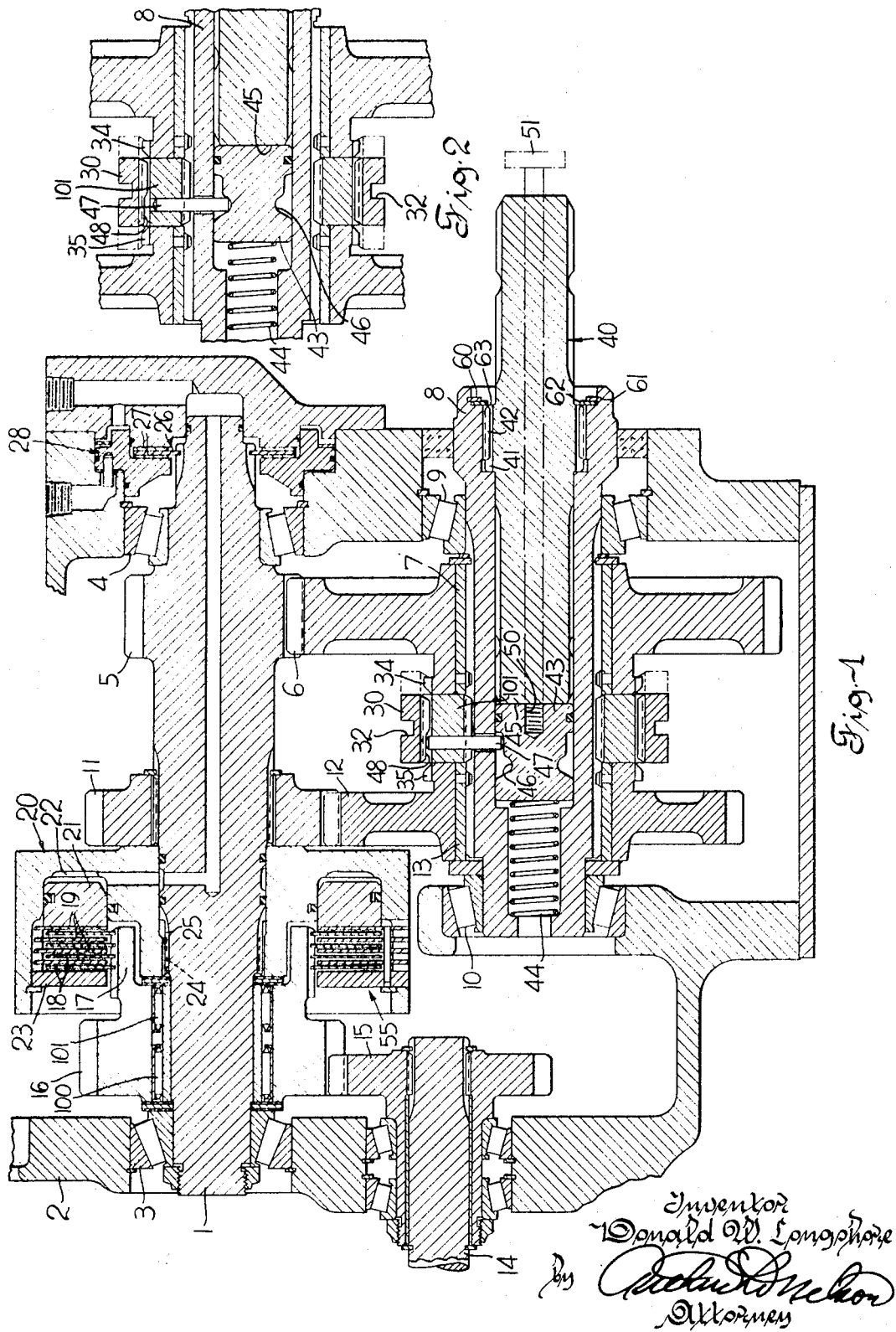
Inventor
Donald W. Longshore
by
Attorney Sept. 2, 1969     D. W. LONGSHORE     3,464,277

TWO SPEED POWER TAKE-OFF

Filed March 28, 1968     2 Sheets-Sheet 2

Inventor
Donald W. Longshore
Attorney

United States Patent Office 3,464,277
Patented Sept. 2, 1969

3,464,277
TWO SPEED POWER TAKE-OFF
Donald W. Longshore, New Berlin, Wis., assignor to Allis-Chalmers Manufacturing Company, Milwaukee, Wis.
Filed Mar. 28, 1968, Ser. No. 716,972
Int. Cl. F16h 37/02, 5/06; G05g 5/10
U.S. Cl. 74—15.4          10 Claims

ABSTRACT OF THE DISCLOSURE

A power take-off assembly with a reversible power take-off shaft providing a different shaft take-off speed for each end of the shaft.

---

This invention relates to a power take-off assembly and more particularly to a means for adjusting a reversible take-off shaft for two speed power take-off from the power take-off assembly.

For a number of years, industrial and farm tractors have been fitted with power take-off shafts to drive implements and farm machinery of one type or another. With each succeeding year, there has been an increase in the number and the type of machinery operated from the power take-off shaft. Higher engine horsepower and the greater versatility of the tractor has proven the inadequacy of the 540 r.p.m. power take-off speed.

Accordingly, in recent years the power take-off speed has been increased to a standard 1,000 r.p.m. for certain types of implements and machinery. The spline connection for the power take-off shaft of this higher speed has also been changed to avoid the danger of driving machinery at speeds above which they were designed. Since either speed is still in common usage, it is necessary to design a tractor with an interchangeable power take-off shaft to deliver either the 540 r.p.m. or the 1,000 r.p.m. speed. This invention provides a means whereby a tractor may be used interchangeably to drive a power take-off shaft at either 540 r.p.m. with the six spline take-off connection or the 1,000 r.p.m. with the 21 spline connection.

It is an object of this invention to provide a two speed power take-off assembly having a reversible power take-off shaft adapted for use to selectively drive an implement at the 540 r.p.m. or 1,000 r.p.m. speed.

It is another object of this invention to provide a two speed power take-off assembly having an interlock actuated by the reversible power take-off shaft which limits the drive speed to the 540 r.p.m. speed when the 540 r.p.m. shaft end is positioned for connection to the machinery.

It is a further object of this invention to provide a two speed take-off reversible stub shaft with standard spline ends and an interlock actuator to correlate the power take-off drive speed with the power take-off drive end connected to the implement.

The objects of this invention are accomplished by a power take-off assembly including a power driven shaft for driving two gears. A driven sleeve which carries two freely rotatable driven gears rotating at different speeds, is mounted in parallel relationship to the axis of the two driving gears, and a clutch is positioned with its axis coincidental with the driven sleeve. The clutch may be slidably positioned to selectively and alternatively engage either of said driven gears to drive said sleeve at either predetermined output speed or remain in neutral without coupling either gear to the driven sleeve. A reversible power take-off shaft fitted with a standard 6 tooth spline and the 21 tooth spline on opposite ends is reversibly received within said sleeve. The positioning of the power take-off shaft in the position for low speed output biases a member engaging an interlock to prevent the clutch for connecting the high speed gear to the sleeve. Manual means are provided for engaging the clutch to the suitable speed to provide the desired output speed. A power take-off assembly provides output speeds of 540 r.p.m. or 1,000 r.p.m. with suitable standard spline connection for machinery designed for either of these two speeds.

The preferred embodiments of this invention will be subsequently described and are illustrated in the attached drawings.

FIG. 1 is a cross section view of the power take-off assembly and the input drive shaft.

FIG. 2 is an enlarged cross section view of the interlock controlling movement of the clutch in response to the reversing of the power take-off shaft.

Figure 3:
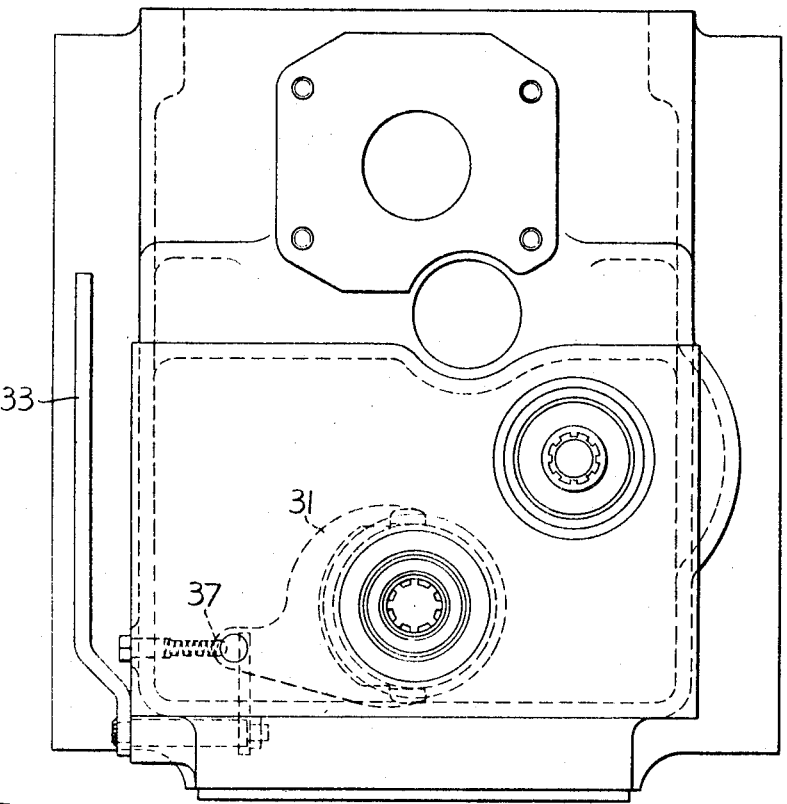
FIG. 3 is an end view of the power take-off assembly.

Referring to FIG. 1, a cross section view of the power take-off with the brake and clutch is illustrated. The countershaft 1 is driven through a suitable power train including drive shaft 14 by the engine. The countershaft 1 is journaled within the housing 2 on the bearing assembly 3 on the left-hand end and the bearing assembly 4 on the right-hand end. A gear 5 is formed integral with the countershaft 1 which drives a gear 6. The gear 6 is supported on a bushing 7 which embraces the sleeve 8 which in turn is rotatably supported by the bearing assemblies 9 and 10 in the housing 2.

The countershaft 1 is also splined to the gear 11 which drives the spur gear 12 which in turn is supported on a bushing 13 which encircles the sleeve 8.

The drive shaft 14 is splined to the pinion gear 15 which drives the gear 16 which is journaled on roller bearings 100 and 101 which are supported on the countershaft 1. The gear 16 has an axial flange 17 which is splined to receive the clutch disks 18 which frictionally engage clutch disks 19 which in turn are mounted on the internally splined axial sleeve portion of the hydraulic cylinder 20. Hydraulic piston 21 is axially displaced against the disk stack in response to pressurized fluid within the chamber 22 which frictionally engages the clutch disks against the pressure plate 23.

The clutch cylinder 20 extends radially inward and defines a spline 24 receiving complementary splines 25 on the countershaft 1 for driving the countershaft 1. The opposite end of the countershaft 1 is fastened to rotary brake disks 26 which frictionally engage stator disks 27 of the brake housing 28. The clutch and the brake provide a means for engaging and disengaging the countershaft 1 from the drive train through gears 15 and 16.

The collar 30 is coaxially mounted on the carrier bushing 101 embracing the sleeve 8 and slidable from a neutral position as shown in FIG. 1 to a right-hand position for coupling the gear 6 to the sleeve 8. Also a left-hand position for coupling the gear 12 to the sleeve 8 is permitted as shown in FIG. 2.

FIG. 3 illustrates the location from which the view in FIG. 1 is taken. Also illustrated in FIG. 3 is the fork 31 which fits into the annular recess 32 to slide the collar 30 axially to engage either gear 6 or 12 with the sleeve 8. An actuating lever 33 is pivotally mounted on the housing and slidably moves the fork 31 for the desired engagement of the gears with the sleeve.

Figures 4, 5:
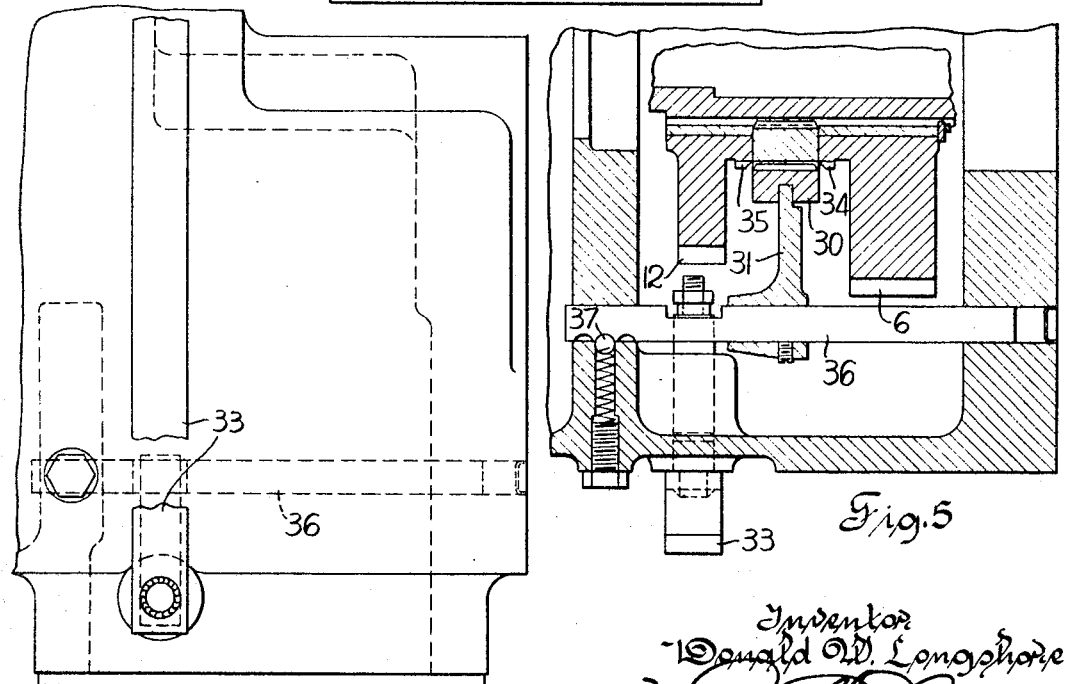
FIG. 4 is a side elevation view of the actuating lever for shifting the clutch on the power take-off assembly.
FIG. 5 is a cross section view of the clutch actuating means.

FIG. 4 is a side view of the clutch actuating means and FIG. 5 is a cross section view illustrating the manner in which the collar 30 slides axially to engage the external spline 34 of gear 6 or the external spline 35 of gear 12. The fork 31 is locked on the shaft 36 to slidably carry the fork for desired engagement of the clutch. A detent mechanism 37 maintains the positioning of the clutch collar 30 once the engagement or disengagement has been established.

Referring to FIGS. 1 and 2, the power take-off shaft 40 is inserted into the sleeve 8 with a portion of the shaft 40 extending beyond the housing which is adapted for connection to the power receiving coupling of an implement. The shaft 40 has an intermediate spline portion 41 which mates the internal spline 42 on the sleeve 8. The portion of the shaft extending into the sleeve 8 is splined, however, when the shaft is in this position the spline portion extending into the sleeve is ineffective in transmitting any drive force. The interlock actuator 43 is spring biased by the spring 44 to engage the facing 45 on the shaft 40. An annular recess 46 receives the pin 47 and in the position shown is biased to an upper position to constrain the movement of the collar 30 to a right-hand movement only as shown in FIG. 1. The pin 47 is shown in FIG. 2 in the alternate position wherein the collar 30 may be manually moved as described above in either a right-hand or left-hand direction to couple the sleeve 8 for 540 r.p.m. speed or the 1,000 r.p.m. speed.

The collar 30 is formed with an annular recess 48 on the left-hand end which receives the pin 47 which operates as an interlock in constraining the movement of the collar 30 only in the right-hand direction as shown in FIG 1. The preferred embodiment of this invention is illustrated in FIGS. 1 and 2 wherein the facing 45 of the shaft 40 biases the actuator 43 against the force of the spring 44 to the position as shown constraining the movement of the collar in the right-hand direction. Insertion of the shaft in this position limits the movement of the collar 30 as shown.

FIG. 2 illustrates the spring 44 biasing the actuator 43 to a right-hand position allowing the pin 47 to drop within the recess 46 to the low position. This permits the sleeve 30 to slide in either direction. FIG. 1 further illustrates a threaded opening 50 in the end of the actuator 43. A phantom view of a bolt 51 is shown positioned for moving the actuator 43 to either position. It is understood that the actuator might be moved by a mechanical means without the spring 44 such as the bolt 51 to seat the pin 47 in the right-hand or left-hand portion of the recess 46 as desired. The power take-off shaft 40 then may be reversed or interchanged to position the shaft so that the desired standard spline end of either 6-tooth spline or 21-tooth spline will extend from the housing. In this manner, the actuator 43 will be positioned to preset the interlock to drive the implement at its designed speed, and the equipment to be driven by the power take-off shaft will be coupled to the power take-off shaft.

The threaded opening 50 and bolt 51 may also be provided to insure positive movement of the actuator 43 for the desired coupling of speed to drive the power take-off shaft 40 in event of spring failure.

The operation of this device will be described in the following paragraphs.

The drive shaft 14 receives power from an engine driven power transmission which in turn drives the pinion 15 which meshes with the gear 16. Power is then transmitted through the clutch 55 to the countershaft 1. The countershaft 1 is splined to the gear 11 and is integral with the gear 5 and drives these gears at a common speed with countershaft 1. The gear 11 drives gear 12 which rotates on bushing 13. The countershaft 1 also drives the gear 5 which in turn drives gear 6 which rotates on its bushing 7 at a speed other than the speed of gear 12. The speed of gear 6 drives the power take-off shaft at 540 r.p.m. while the gear 12 will drive the power take-off shaft at 1,000 r.p.m. when the collar 30 couples the respective gear.

The power take-off shaft 40 is constructed with a standard 21-tooth spline on one end and the reverse end carries a standard 6-tooth spline which is adapted for driving an implement at 1,000 r.p.m. and 540 r.p.m. respectively. The shaft 40 is reversible in the sleeve 8. The spline 41 on the intermediate portion and external periphery of the shaft 40 is adapted for engaging the internal splined periphery of the sleeve 8. The snap ring 60 is adapted for easy removal from the end of the sleeve 8 from the annular recess 61. The snap ring 60 retains a washer 62 in position against the shoulder 63 of the shaft 40. Once the snap ring and washer are removed, the shaft 40 may be removed and reversed to position the opposite end of the shaft in the sleeve 8. With the short end of the shaft extending into the sleeve, the actuator 43 is biased by the spring 40 to a right-hand position as shown in FIG. 2. This permits the pin to drop into the left-hand portion of the recess and permits the collar to be manually actuated to the right- or left-hand position.

When the power take-off shaft is positioned as shown in FIG. 1, the long end of the shaft biases the actuator 43 to a left-hand position which in turn raises the pin 47 and operates as an interlock to prevent left-hand movement of the collar 30 in response to the manual shift lever 33. In this position, it can be seen that the collar 30 moves only to the right-hand position to engage the gear 6 and couple the gear 6 to the sleeve 8. This places in engagement the 540 r.p.m. speed to drive the sleeve 8 which carries the shaft 40 which will operate only with equipment designed to receive the 6 tooth spline end.

When it is desired to limit the coupling only to gear 6, then the power take-off shaft 40 is reversed and the long end of the power take-off shaft as shown in FIG. 1 will automatically bias the actuator 43 to a left-hand position and the interlock will then prevent driving through the high speed range of the power take-off. This will prevent any danger of driving machinery at a speed higher than its rated speed. When the power take-off shaft 40 is connected to machinery which is designed to operate from the 1,000 r.p.m. spline connection the clutch may be engaged in either position.

In event the modification of this device is used wherein the spring 44 is not incorporated in the assembly, the actuator may be manually operated by the bolt 51 to position the actuator 43 in the position as shown in FIG. 2 or the position shown in FIG. 1. A detent may be provided in the sleeve 8 to retain the actuator 43 in either of the two positions.

It is understood that the clutch 55 and the brake 28 are hydraulically actuated and may be used to bring the rotation of the countershaft 1 to a stop before the collar 30 is shifted to engage either the gear 6 or 12. When the engagement to the proper gear is made, the clutch and brake will then be actuated in a suitable manner to transmit power through the clutch 55 to drive the power take-off assembly.

The preferred embodiment of this invention has been illustrated and described and the limits of this invention will be defined in the attached claims.

The embodiments of the invention in which an exclusive property or privilege is claimed are defined as follows:

1. A two speed power take-off assembly comprising a power driven drive system driving a first and a second gear at a high and a low rotational speed respectively, a driven sleeve means, a clutch means for selectively and alternatively engaging said sleeve means with said first and said second gear, a reversible power take-off shaft having means for drivingly connecting said shaft to said sleeve means with a standard high speed spline end and a standard low speed spline end on said power take-off shaft for interchangeably extending from said sleeve means, an interlock engaging said clutch means, an actuator operating in response to positioning of said shaft and engaging said interlock to limit movement of said clutch means for clutching of said low speed gear with said sleeve means when the standard low speed spline end of said shaft is positioned for delivery of power from the power take-off assembly.

2. A two speed power take-off assembly as set forth in claim 1 wherein said gears are mounted coaxially with said sleeve means and rotate either relative to said sleeve or synchronously with said sleeve when said clutch is engaged.

3. A two speed power take-off assembly as set forth in claim 1 wherein said clutching means is an axially slidable collar having an internally splined portion to engage externally splined portions on either of said gears.

4. A two speed power take-off assembly as set forth in claim 1 wherein manual means are provided to axially slide said clutching means for selective and alternative engagement with said gears.

5. A two speed power take-off assembly as set forth in claim 1 wherein said interlock comprises a pin radially positioned relative to said sleeve means limited to a radial movement in response to movement of said actuator positioned in said sleeve means, a collar in said clutch means defining an annular recess for reception of said pin which limits the axial movement of said collar to a first direction for driving said power take-off shaft at the 540 r.p.m. range when said spline end adapted for connection to an implement designed to rotate and at 540 r.p.m. extends externally of the assembly.

6. A two speed power take-off assembly as set forth in claim 1 wherein the actuator used to operate the interlock is positioned axially within the sleeve means and is moved by engagement with the butt end of said power take-off shaft in a first position to limit subsequent axial movement of said clutch to one direction and thereby control the maximum speed of the power take-off shaft.

7. A two speed power take-off assembly as set forth in claim 1 wherein said actuator is spring biased to a second position when said power take-off shaft is reversed and said interlock does not limit the movement of said clutch to a single direction.

8. A two speed power take-off assembly as set forth in claim 1 wherein a manual actuator is used which is mechanically and selectively positioned in one of two positions to control the movement of the interlock and clutch means to control the speed of the power take-off shaft.

9. A two speed power take-off assembly as set forth in claim 1 wherein an actuator controlling the movement of the interlock is spring biased in a first position and actuated by the power take-off shaft in the opposite direction to control the subsequent movement of said clutch means and output speed of the power take-off shaft.

10. A two speed power take-off assembly as set forth in claim 1 wherein the clutch means may be positioned in a neutral position wherein said clutch means is not engaging either of said gears.

References Cited

UNITED STATES PATENTS

| | | | |
|---|---|---|---|
| 3,049,929 | 8/1962 | Wagner | 74—477 X |
| 3,279,275 | 10/1966 | Christie | 74—15.4 X |
| 3,352,165 | 11/1967 | Lee | 74—15.4 |

LEONARD H. GERIN, Primary Examiner

U.S. Cl. X.R.

74—335, 477, 483